US009889552B2

(12) United States Patent
Escamilla

(10) Patent No.: US 9,889,552 B2
(45) Date of Patent: Feb. 13, 2018

(54) APPARATUS FOR SECURING A WORK PIECE

(71) Applicant: Pete Escamilla, Encinitas, CA (US)

(72) Inventor: Pete Escamilla, Encinitas, CA (US)

( * ) Notice: Subject to any disclaimer, the term of this patent is extended or adjusted under 35 U.S.C. 154(b) by 38 days.

(21) Appl. No.: 14/684,435

(22) Filed: Apr. 13, 2015

(65) Prior Publication Data

US 2015/0290792 A1 Oct. 15, 2015

Related U.S. Application Data

(60) Provisional application No. 61/978,870, filed on Apr. 12, 2014.

(51) Int. Cl.

| | |
|---|---|
| ***B23Q 3/00*** | (2006.01) |
| ***B25H 1/00*** | (2006.01) |
| ***B26D 7/01*** | (2006.01) |
| ***B26D 7/08*** | (2006.01) |

(52) U.S. Cl.
CPC ................ *B25H 1/00* (2013.01); *B26D 7/01* (2013.01); *B26D 7/088* (2013.01); *B26D 2007/013* (2013.01)

(58) Field of Classification Search
USPC ........................................... 269/3, 9, 43, 95
See application file for complete search history.

(56) References Cited

U.S. PATENT DOCUMENTS

| | | | | |
|---|---|---|---|---|
| 2,003,619 A * | 6/1935 | Williamson | B23D 51/04 | 269/249 |
| 3,063,705 A * | 11/1962 | Sachs | B25B 1/20 | 269/287 |
| 3,432,160 A * | 3/1969 | Wovcha | B23K 7/10 | 269/287 |
| 5,621,936 A * | 4/1997 | Penaligon | A44B 15/005 | 206/234 |
| 8,777,204 B2 * | 7/2014 | Ruland | B25H 1/08 | 269/3 |
| 2004/0065989 A1 * | 4/2004 | Campbell | B25B 5/147 | 269/17 |
| 2013/0127104 A1 * | 5/2013 | Onello | B25B 1/103 | 269/99 |
| 2014/0027395 A1 * | 1/2014 | Benoit | B65D 88/129 | 211/70.4 |

* cited by examiner

*Primary Examiner* — Joseph J Hail
*Assistant Examiner* — Shantese McDonald

(57) ABSTRACT

An apparatus for securing work pieces includes a body member, a first passageway, and a second passageway. The body member is configured to engage an open end of a vessel. The body member includes a top surface, a bottom surface, and a side surface that enclose an interior portion. The first passageway is formed within the interior portion along a first chord of the body member extending in a first plane parallel to the top surface and the bottom surface. The first passageway terminates in a first entry aperture and a first exit aperture in the side surface. The second passageway is formed within the interior portion along a second chord of the body member extending in a second plane parallel to the top surface and the bottom surface. The second passageway terminates in a second entry aperture and a second exit aperture in the side surface.

12 Claims, 7 Drawing Sheets

APPARATUS FOR SECURING A WORK PIECE

CROSS-REFERENCE TO RELATED APPLICATION

This application claims priority to U.S. Provisional Application No. 61/978,870 entitled "Apparatus for Securing a Workpiece" which is incorporated herein by reference in its entirety.

FIELD

The invention generally relates to apparatuses for securing work pieces being worked on by one or more tools.

BACKGROUND

Construction work requires many tools and supplies to be carried to and from a worksite. Some supplies, such as pipe, lumber, and other stock materials may require cutting, bending, or other shaping to be performed prior to their use in a construction project. These supplies may be in the form of a work piece such as a length of pipe, lumber, or other elongated stock material. It may be necessary to perform work on the work piece using one or more tools to achieve a desired length, contour, or overall fit for the particular use at the worksite.

In order to perform work on the work piece, oftentimes forces must be applied by the tools. For example, a work piece of PVC pipe may require a metal saw blade to reciprocate while a downward force is applied to force the blade to cut the pipe. A work piece of metal pipe may require a greater downward force than the PVC pipe. Lumber may also require a downward force to cause the blade to travel deeper into the work piece. In some examples, the work piece may require bending. For example, a work piece of copper pipe for plumbing, steel rebar for concrete, conduit for electrical wiring, or other plastically deformable material may be bent using a pipe bender or other tool.

In order to quickly and accurately achieve the desired length, contour or shape, the work piece must be firmly secured to a surface or other weighted anchor. Securing the work piece enables easier application of the necessary forces to cut, bend, or shape the work piece. While the work piece may simply be placed on the ground or on another rigid surface, it may move or roll out of place while work is done to the work piece.

At worksites where space may be limited, often the work piece is simply cantilevered from a surface of a wall or a table. It is also known to secure such work pieces using various securing devices such as clamps, sawhorses, and other tools and supplies. However, these additional tools and supplies must be brought to the worksite and may not provide the best fit for the work piece or may cause undesirable deformation of the work piece. For example, PVC and copper pipe may be dented or cracked due to forces from clamps. Heavier work pieces, whether due to material or dimensions, may require adding strength and weight to the securing devices. In addition, the additional securing devices may easily be lost or forgotten.

SUMMARY

An exemplary apparatus for securing work pieces is provided. The apparatus includes a body member and a first passageway. The body member is configured to engage an open end of a vessel. The body member includes a top surface, a bottom surface, and a side surface that enclose an interior portion. The first passageway is formed within the interior portion along a first chord of the body member and extends in a first plane parallel to the top surface and the bottom surface and terminating in a first entry aperture.

In other features, the first passageway includes a first cross-section having a first perimeter dimension. In still other features, the body member includes a first exit aperture in the side surface. The first passageway terminates in the first exit aperture to enable a first work piece to pass through the interior portion.

In yet other features, the apparatus includes a second passageway formed within the interior portion along a second chord of the body member extending in a second plane parallel to the top surface and the bottom surface and terminating in a second entry aperture. In still other features, the second passageway includes a second cross-section having a second perimeter dimension. In still other features, the body member includes a second exit aperture in the side surface. The second passageway terminates in the second exit aperture to enable a second work piece to pass through the interior portion.

In still other features, the body member is configured to secure an anchoring material comprising at least one of sand, gravel, and water within the vessel.

In other features, the first passageway forms a first cylindrical tube configured to receive a first work piece comprising a first pipe of a first diameter. The second passageway forms a second cylindrical tube to configured to receive a second work piece comprising a second pipe of a second diameter.

In yet other features, a grip surface is provided on one of the first entry aperture and the first exit aperture. The grip surface includes one of rubber, silicone, and a machined surface.

In still other features, the body member includes a cylindrical shape. The body member is configured to be secured to the vessel by one of a friction fit, a snap ring, a tab, and a quick-release mechanism.

In other features, the apparatus includes an opener in the side surface configured to grip a closure member of a container. The opener is formed within a recessed portion of the side surface and includes a pair of opposed grip walls including grip surfaces configured to grip the closure member.

In yet other features, the body member includes a honeycomb structure within the interior portion and extending from the top surface to the bottom surface.

An apparatus is provided that secures work pieces for cutting and for opening a closure member of a container. The apparatus includes a body member, a first passageway, and a second passageway. The body member is configured to engage an open end of a vessel. The body member includes a top surface, a bottom surface, and a side surface that enclose an interior portion. The first passageway is formed within the interior portion along a first chord of the body member extending in a first plane parallel to the top surface and the bottom surface. The first passageway terminates in a first entry aperture and a first exit aperture in the side surface. The second passageway is formed within the interior portion along a second chord of the body member extending in a second plane parallel to the top surface and the bottom surface. The second passageway terminates in a second entry aperture and a second exit aperture in the side surface.

In other features, the first passageway is configured to receive a first work piece having a first diameter and the second passageway is configured to receive a second work piece having a second diameter greater than the first diameter.

In yet other features, the body member includes an opener in the side surface configured to grip the closure member while rotating the container.

An apparatus is provided for securing elongated first and second work pieces while working on the work pieces and for opening a closure member of a container. The apparatus includes a vessel, a cylindrical body member, a first passageway, a second passageway, and an opener.

The vessel includes an open end and is configured to hold an anchoring material. The cylindrical body member is configured to engage the open end of the vessel. The cylindrical body member includes a top surface, a bottom surface, and a side surface that enclose an interior portion.

The first passageway is formed within the interior portion along a first chord of the cylindrical body member extending in a first plane parallel to the top surface and the bottom surface. The first passageway terminates in a first entry aperture and a first exit aperture in the side surface. The first passageway configured to receive a first work piece having a first diameter;

The second passageway is formed within the interior portion along a second chord of the cylindrical body member extending in a second plane parallel to the top surface and the bottom surface. The second passageway terminates in a second entry aperture and a second exit aperture in the side surface. The second passageway is configured to receive a second work piece having a second diameter greater than the first diameter.

The opener is disposed within a recessed portion of the side surface and is configured to grip the closure member while rotating the container to break the closure member free and open the container.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

DETAILED DESCRIPTION

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein. The words proximal and distal are applied herein to denote specific ends of components of the instrument described herein. A proximal end refers to the end of an instrument nearer to an operator of the instrument when the instrument is being used. A distal end refers to the end of a component further from the operator and extending towards the surgical area of a patient and/or the implant.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Various apparatuses for securing work pieces being worked on by one or more tools are known. However, these apparatuses are typically not portable, break easily, are frequently lost, and are not custom fitted to the particular needs of working on work pieces of specific geometries that may be easily broken or deformed. Furthermore, prior apparatuses were designed for the sole purpose of securing a work piece. The apparatus of the present disclosure provides improved compactness, portability, and reliability while integrating with existing tools and supplies frequently brought to a worksite. The apparatus may be used with ordinary vessels and weighty materials commonly found throughout construction sites, namely buckets and fill materials such as sand, gravel, and water.

As illustrated in FIGS. 1-7, an exemplary apparatus 100 for securing a work piece to be worked on by one or more tools is shown. The apparatus 100 may be used in conjunction with a vessel 200 such as a pail, bucket, or other vessel frequently used in construction work. For example, the vessel 200 may include a cylindrical shape. The vessel 200 may include a standard-sized container such as a 5 gallon bucket. The apparatus 100 may fit within an open end 202 of the vessel 200 and may be secured using a friction fit, snap ring, tabs, or other quick-release mechanism as described herein.

Figure 1:
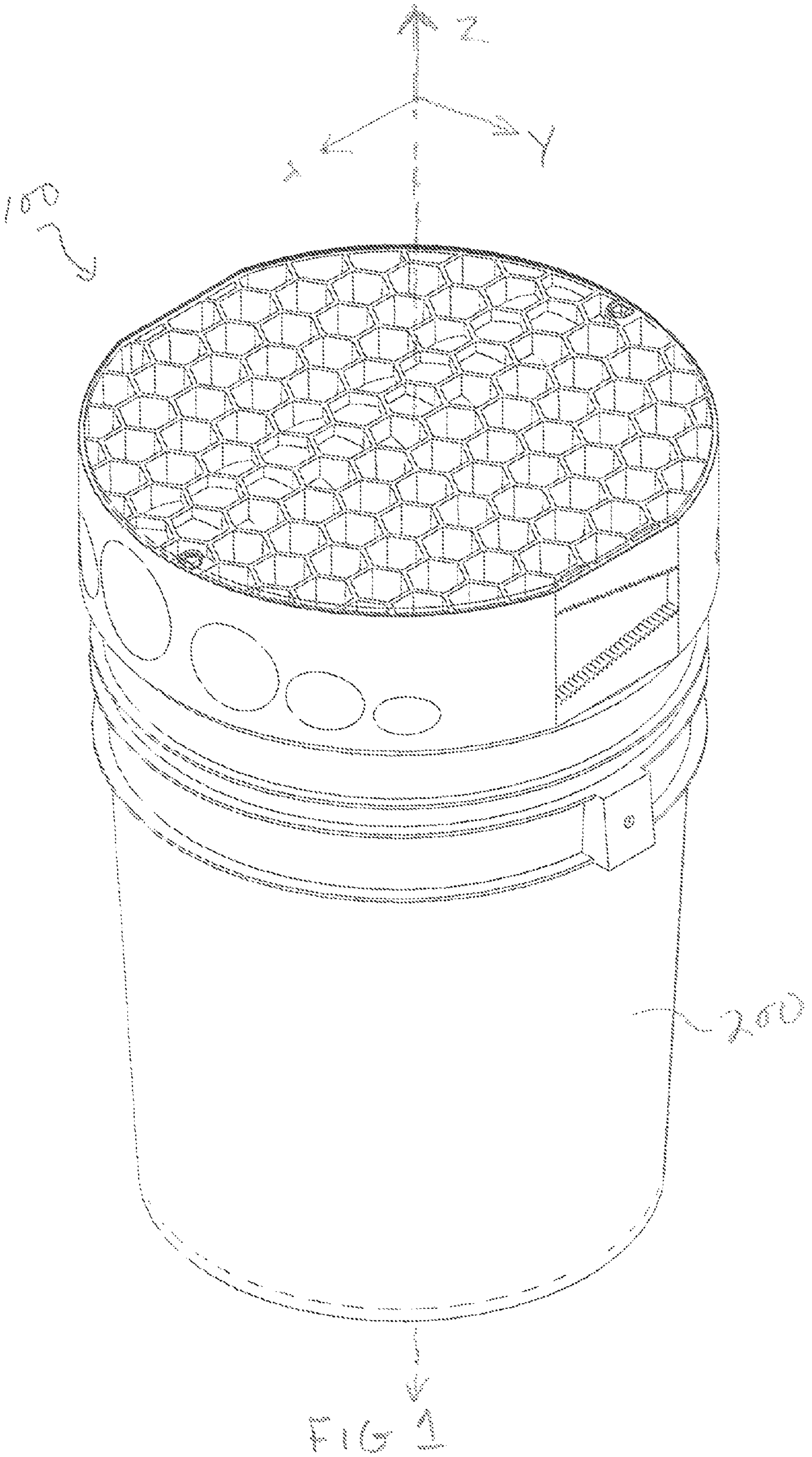
FIG. 1 is a perspective view of an exemplary apparatus for securing a work piece to be worked on by one or more tools.
Figure 2:
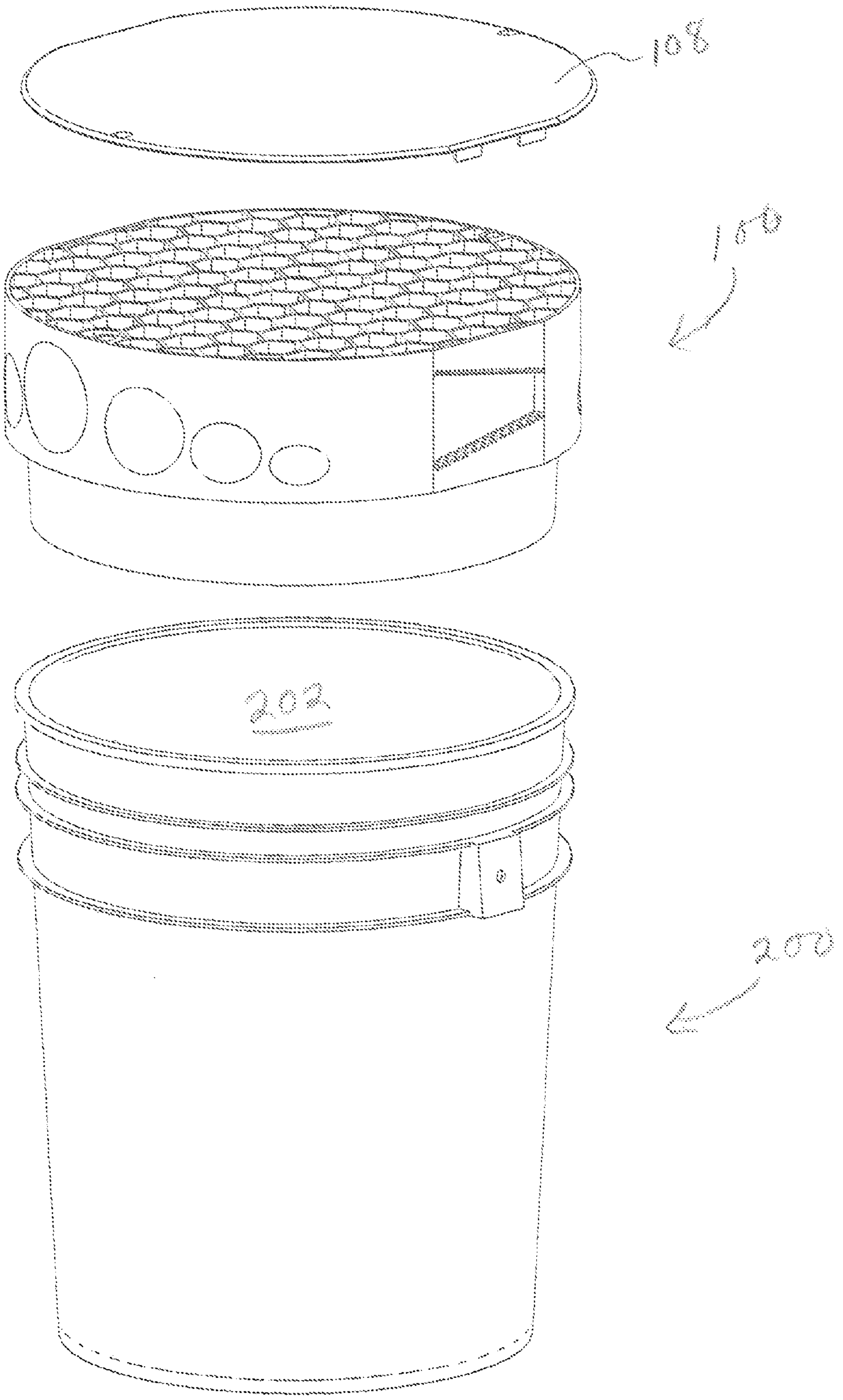
FIG. 2 is an exploded perspective view of the apparatus of FIG. 1 further including a lid.
Figure 3:
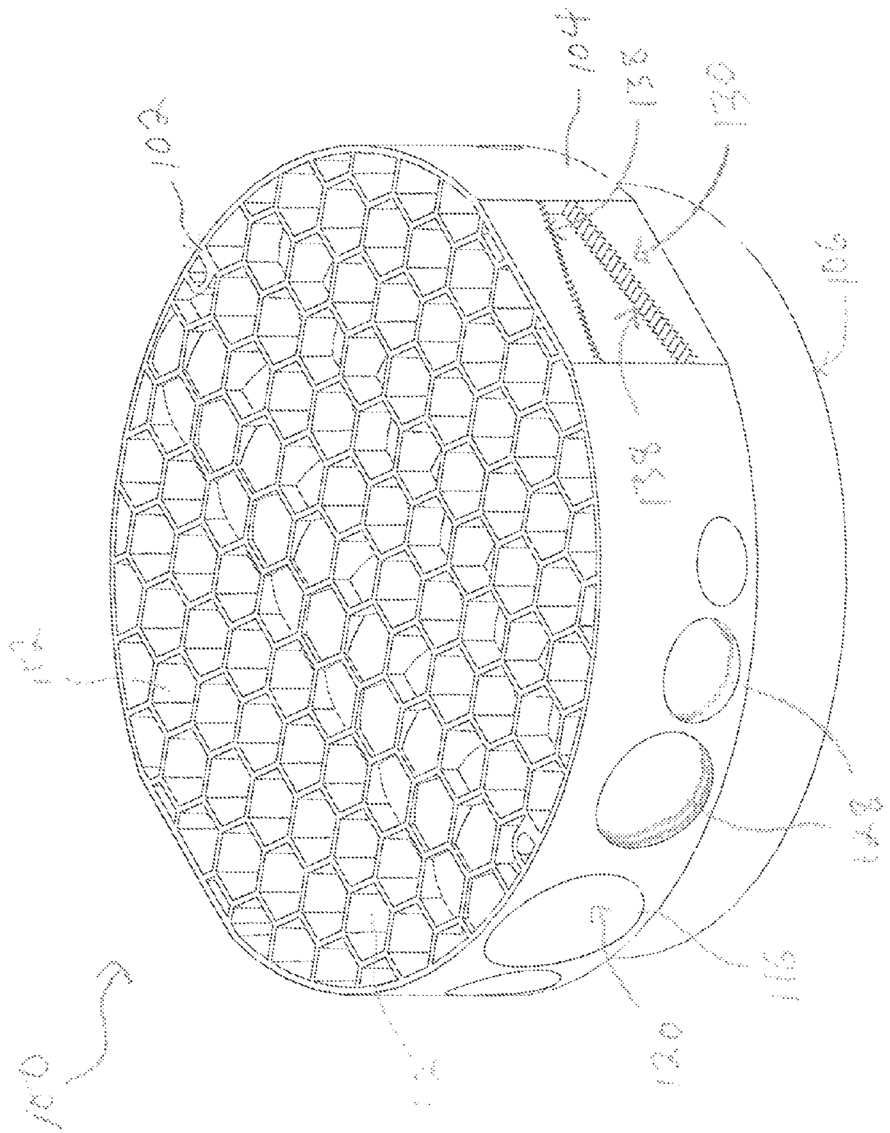
FIG. 3 is a perspective view of the apparatus of FIG. 1 showing top and side surfaces, apertures, and an opener.
Figure 4:
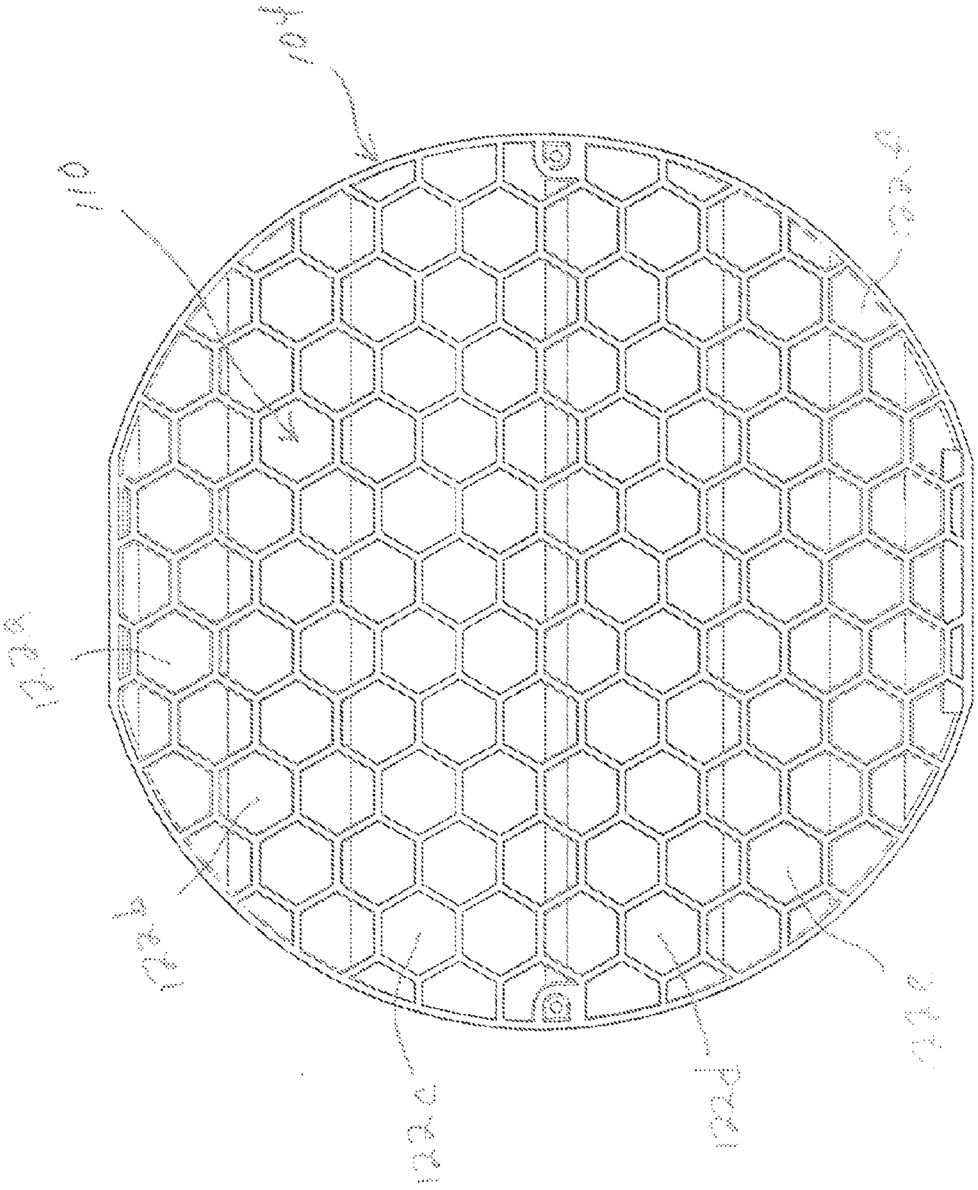
FIG. 4 is a top plan view of the apparatus of FIG. 1 showing an interior portion.
Figure 5:
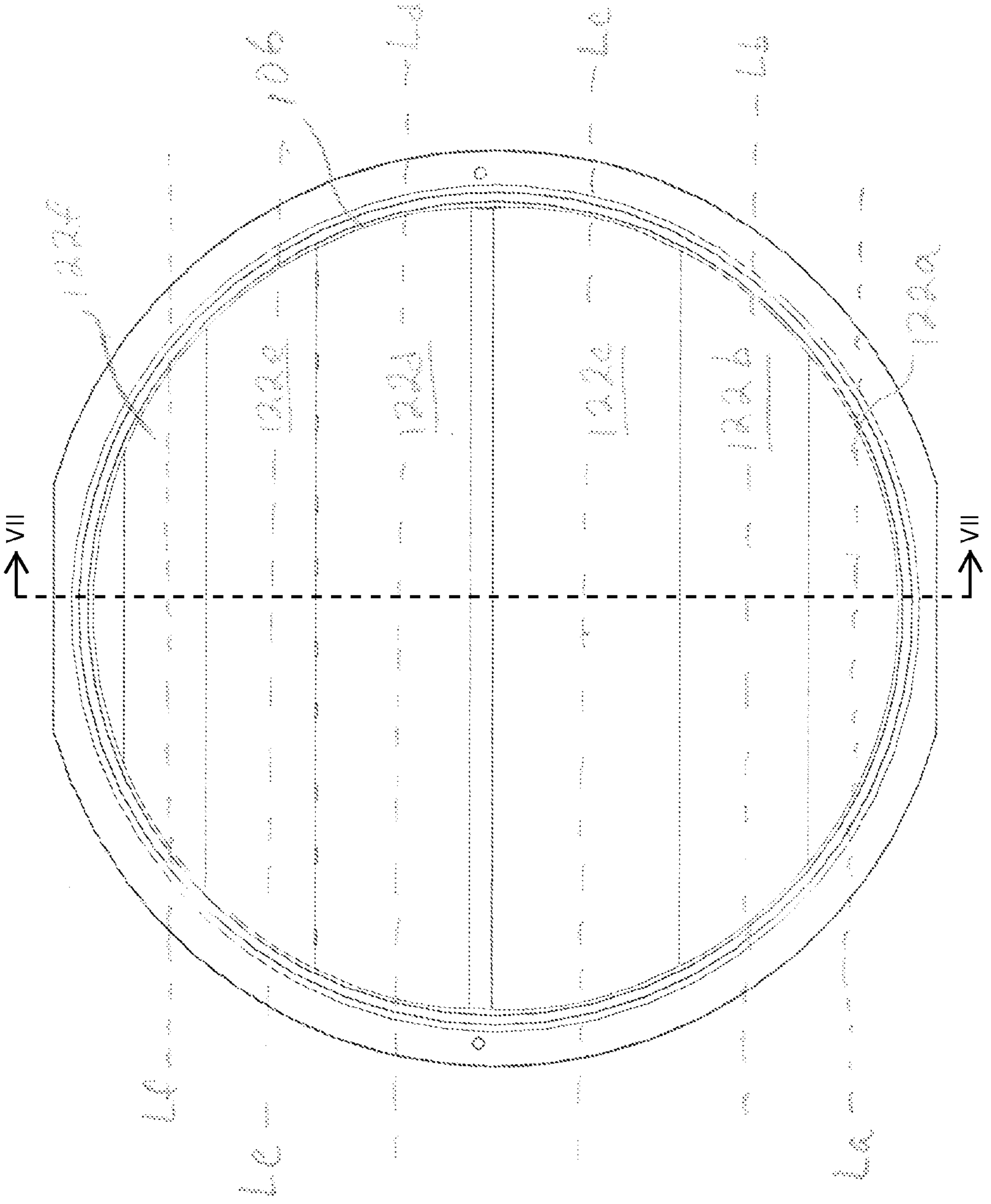
FIG. 5 is a bottom plan view of the apparatus of FIG. 1.
Figure 6:
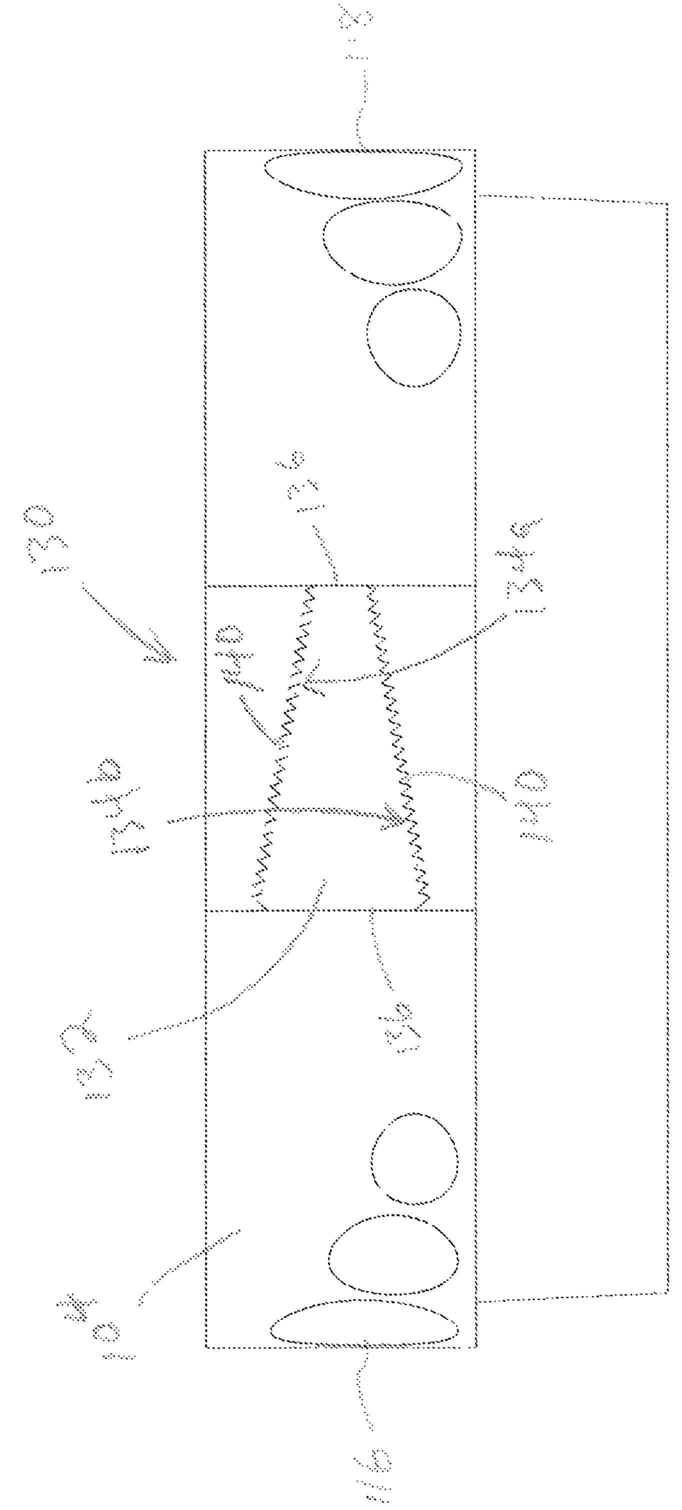
FIG. 6 is a side plan view of the apparatus of FIG. 1 showing an opener.
Figure 7:
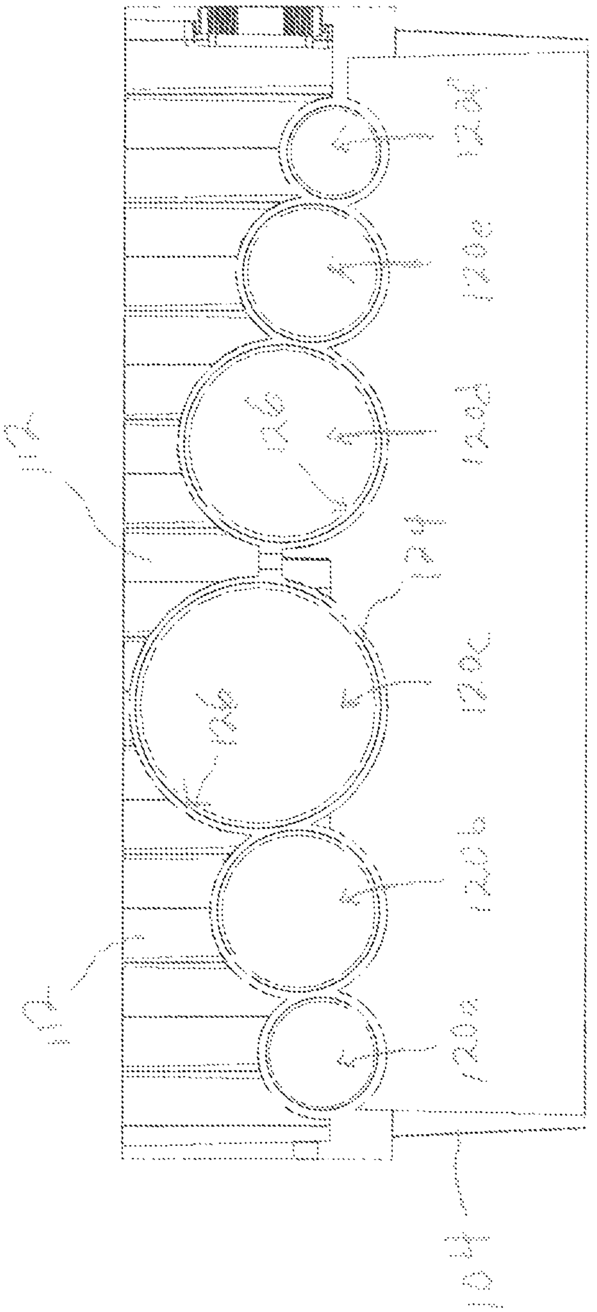
FIG. 7 is a cross sectional view of the apparatus looking into plane VII indicated by arrows shown in FIG. 5.

The apparatus 100 includes a top surface 102, one or more side surfaces 104, and a bottom surface 106. The top surface 102 may include one or more features for attachment to a lid 108. The bottom surface 106 may include one or more features for coupling with the vessel 200. In some examples, the apparatus 100 includes a cylindrical profile corresponding to a cylindrical container. The apparatus 100 includes an interior portion 110 enclosed by the surfaces 102, 104, and 106. The interior portion 110 may include a solid filling. The interior portion 110 may be substantially hollow. Alternatively, the apparatus 100 may include one or more openings formed within the interior portion 110 to reduce weight, improve plastic formation (in exemplary embodiments formed through plastic-injection molding), and/or provide structural support. For example, as illustrated in FIG. 1, the interior portion 110 includes a honeycomb wall 112 extending parallel to a longitudinal axis Z of the apparatus 110 and extending between the top surface 102 and the bottom surface 106. The honeycomb wall 112 may fill the entire interior portion 110 between the one or more side surfaces 104.

The apparatus 100 includes one or more entry apertures 116 and one or more exit apertures 118 within the one or more side surfaces 104. Each entry aperture 116 and each exit aperture 118 includes a passageway 120 extending therebetween and through the interior portion 110. The apertures 116, 118 may be configured with various profiles having cross-sections such as circular, square, rectangular, and the like as required for any number of work piece shapes. Likewise, each passageway 120 includes a matching cross-sectional profile to the apertures 116, 118. For example, the apertures 116, 118 and passageways 120 may be configured for pipe cutting such as PVC pipe. Each of the apertures 116, 118 and passageways 120 may include a radius, a diameter, a perimeter, or a circumference configured to receive standard dimension PVC pipe. In other examples, the apertures 116, 118 and passageways 120 may include widths and heights configured to receive standard dimensions of lumber, copper pipe, electrical conduit, steel rebar, stock metals, and the like.

In the exemplary embodiment of FIGS. 1-7, the apertures 116, 118 and passageways 120 include six entry apertures 116 (*a,b,c,d,e,f*), six exit apertures 118 (*a,b,c,d,e,f*), and six passageways 120 (*a,b,c,d,e,f*). The apertures 116, 118 and passageways 120 may be formed as tubes 122 (*a,b,c,d,e,f*), each of the tubes 122 having a sidewall 124. Although the tubes 122 include circular profiles, it may be appreciated by one of skill in the art that the tubes 122 may include any cross-section profile as described above including widths and heights, rectangular, triangular, or any other geometric configurations as required by the work piece.

The tubes 122 may be arranged to extend across chords of the apparatus 100 in one or more planes parallel to an XY plane that is perpendicular to the longitudinal axis Z. The tubes 122 may be arranged substantially parallel to one another along the chords with longitudinal axes L (*a,b,c,d, e,f*) that are parallel. The longitudinal axes L may lie within the same plane or within several planes. In various arrangements, the tubes 122 may overlap or cross one another. For example, the tubes 122 may extend parallel to one another along the longitudinal axes L, but each axis L may lie in separate planes to permit fitting of numerous passageways 120 within the interior portion 110. For example, the tubes 122 may be staggered or stacked one upon the other. As illustrated in FIGS. 1-7, the tubes 122 are arranged such that the longitudinal axes L are parallel and in several planes parallel to the XY plane. The tubes 122 are also arranged such that tangential points of the sidewalls 124 share a common plane that is parallel to the XY plane.

The passageways 120 may include interior surfaces 126 that are substantially smooth to ease insertion and removal of the work piece. The apertures 116, 118 may also be substantially smooth. Alternately, the entry apertures 116 and/or the exit apertures 118 may include a grip surface 128 to secure the work piece and prevent the work piece from sliding within the lumen 120 while being worked on. For example, in a cutting procedure, the downward force of the cutting blade may forcibly engage the work piece with the grip surface 128 and prevent sliding of the work piece while cutting. The grip surface 128 may be machined into the apertures 116, 118. Alternately, the grip surface 128 may include application of a rubber, silicone, plastic gasket or O-ring (not shown), or the like.

In other exemplary features, the apparatus 100 may include an opener 130 configured to assist with opening other containers containing supplies for use with the work piece. Frequently, the supplies include liquids or pastes used during cutting, bending, joining, soldering, etc., and often the liquids dry up, cure, or otherwise solidify making removal of closure members of the containers difficult. For example, when working with a work piece such as PVC pipe, it may be necessary to use PVC cement to join one more PVC couplings to the PVC pipe. In other examples, epoxy, glue, or various other supplies may be used in conjunction with the work piece. The opener 130 may include features for gripping the closure member of the container such that a user may rotate the container while the opener 130 holds the closure member in place.

As illustrated in FIGS. 1-7, the opener 130 may be formed in a recessed portion 132 of the side surface 104 of the apparatus 100. The recessed portion 132 may be configured to receive a variety of sizes of closure members. For example, the recessed portion 132 may include a pair of grip walls 134 that angle towards one another. A first grip wall 134*a* may be proximate to the top surface 102 and a second grip wall 134*b* may be proximate to the bottom surface 106. One or both grip walls 134 may angle away from planes encompassed by one or both of the top surface 102 and the bottom surface 106. The grip walls 134 may include substantially straight walls or alternatively may include curved or elliptical walls. In some examples, the recessed portion 132 forms a trapezoidal shape due to the angled grip walls 134 and adjacent parallel side walls 136.

Each grip wall 134 includes a grip surface 138. The grip surface 138 may include a grip surfaces similar to the grip surface 128 of the apertures 116, 118. The grip surface 138 may include teeth 140. The teeth 140 may include a saw-tooth profile or other jagged tooth profile for engaging the closure member of the container. The teeth 140 may include a profile that mates with the closure member of the container. The grip surface 138 may include a rubber coating. The grip surface 138 may include a silicone coating. The user may insert the closure member of the container into the recessed portion 132 and slide the closure member into engagement with the griping surfaces 138. The user may then apply a force to squeeze the closure member between the grip walls 134 while rotating the container to break the closure member loose.

Example embodiments of the methods and systems of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

While the invention has been described in connection with various embodiments, it will be understood that the invention is capable of further modifications. This application is intended to cover any variations, uses, or adaptations of the invention following, in general, the principles of the invention, and including such departures from the present disclosure as, within the known and customary practice within the art to which the invention pertains.

The invention claimed is:

1. An apparatus for securing work pieces, comprising:

a vessel with an open end, the vessel configured to hold an anchoring material;

a cylindrical body member configured to engage an open end of a vessel, the cylindrical body member including a top surface, a bottom surface, and a side surface that enclose an interior portion;

a first passageway formed within the interior portion along a first chord of the cylindrical body member extending in a first plane parallel to the top surface and the bottom surface and terminating in a first entry aperture, wherein the first passageway includes a first cross-section having a first perimeter dimension;

a second passageway formed within the interior portion along a second chord of the cylindrical body member extending in a second plane parallel to the top surface and the bottom surface and terminating in a second entry aperture, wherein the second passageway includes a second cross-section having a second perimeter dimension greater than the first perimeter dimension; and an opener within a recessed portion of the side surface that includes a pair of opposed grip walls including grip surfaces.

2. The apparatus of claim 1, further comprising a first exit aperture in the side surface, the first passageway terminating in the first exit aperture to enable a first work piece to pass through the interior portion.

3. The apparatus of claim 2, further comprising a grip surface on one of the first entry aperture and the first exit aperture.

4. The apparatus of claim 3, wherein the grip surface includes one of rubber, silicone, and a machined surface.

5. The apparatus of claim 1, further comprising a second exit aperture in the side surface, the second passageway terminating in the second exit aperture to enable a second work piece to pass through the interior portion.

6. The apparatus of claim 1, wherein the cylindrical body member is configured to secure an anchoring material comprising at least one of sand, gravel, and water within the vessel.

7. The apparatus of claim 1, wherein the first passageway forms a first cylindrical tube configured to receive a first work piece comprising a first pipe of a first diameter.

8. The apparatus of claim 1, wherein the second passageway forms a second cylindrical tube to configured to receive a second work piece comprising a second pipe of a second diameter.

9. The apparatus of claim 1, wherein the cylindrical body member is configured to be secured to the vessel by one of a friction fit, a snap ring, a tab, and a quick-release mechanism.

10. The apparatus of claim 1, wherein the opener in the side surface is configured to grip a closure member of a container.

11. An apparatus for securing work pieces, comprising:

a cylindrical body member configured to engage an open end of a vessel, the cylindrical body member including a top surface, a bottom surface, and a side surface that enclose an interior portion;

a first passageway formed within the interior portion along a first chord of the cylindrical body member extending in a first plane parallel to the top surface and the bottom surface and terminating in a first entry aperture; and a honeycomb structure within the interior portion and extending from the top surface to the bottom surface.

12. An apparatus for securing elongated first and second work pieces while working on the work pieces and for opening a closure member of a container, comprising:

a vessel with an open end, the vessel configured to hold an anchoring material;

a cylindrical body member configured to engage the open end of the vessel, the cylindrical body member including a top surface, a bottom surface, and a side surface that enclose an interior portion;

a first passageway formed within the interior portion along a first chord of the cylindrical body member extending in a first plane parallel to the top surface and the bottom surface, the first passageway terminating in a first entry aperture and a first exit aperture in the side surface, the first passageway configured to receive a first work piece having a first diameter;

a second passageway formed within the interior portion along a second chord of the cylindrical body member extending in a second plane parallel to the top surface and the bottom surface, the second passageway terminating in a second entry aperture and a second exit aperture in the side surface, the second passageway configured to receive a second work piece having a second diameter greater than the first diameter; and an opener within a recessed portion of the side surface that includes a pair of opposed grip walls including grip surfaces to grip the closure member while rotating the container to break the closure member free and open the container.

* * * * *